(12) United States Patent
Archer et al.

(10) Patent No.: US 9,122,840 B2
(45) Date of Patent: Sep. 1, 2015

(54) PERFORMING COLLECTIVE OPERATIONS IN A DISTRIBUTED PROCESSING SYSTEM

(71) Applicant: INTERNATIONAL BUSINESS MACHINES CORPORATION, Armonk, NY (US)

(72) Inventors: Charles J. Archer, Rochester, MN (US); James E. Carey, Rochester, MN (US); Matthew W. Markland, Rochester, MN (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 13/669,861

(22) Filed: Nov. 6, 2012

(65) Prior Publication Data

US 2013/0066938 A1 Mar. 14, 2013

Related U.S. Application Data

(63) Continuation of application No. 13/181,601, filed on Jul. 13, 2011, now Pat. No. 8,949,328.

(51) Int. Cl.
*G06F 15/16* (2006.01)
*G06F 15/78* (2006.01)
*H04L 12/24* (2006.01)
(Continued)

(52) U.S. Cl.
CPC ............ *G06F 15/781* (2013.01); *G06F 9/5066* (2013.01); *G06F 15/17318* (2013.01); *H04L 41/12* (2013.01)

(58) Field of Classification Search
CPC ...................................... H04L 41/12

USPC .................................................. 709/201, 203
See application file for complete search history.

(56) References Cited

U.S. PATENT DOCUMENTS 4,933,840 A 6/1990 Sera et al.
4,933,846 A 6/1990 Humphrey et al.
(Continued)

OTHER PUBLICATIONS

Almasi, G., et al., "MPI on BlueGene/L: Designing an Efficient General Purpose Messaging Solution for a Large Cellular System," Recent Advances in Parallel Virtual Machine and Message Passing Interface, Proceedings. 10th European PVM/MPI User's Group Meeting, Venice, Italy, Sep. 29-Oct. 2, 2003, pp. 352-361, Springer Berlin Heidelberg. DOI: 10.1007/978-3-540-39924-7_49.

(Continued)

*Primary Examiner* — Adnan Mirza
(74) *Attorney, Agent, or Firm* — Edward J. Lenart; Kennedy Lenart Spraggins LLP

(57) ABSTRACT

Methods, apparatuses, and computer program products for performing collective operations on a hybrid distributed processing system that includes a plurality of compute nodes and a plurality of tasks, each task is assigned a unique rank, and each compute node is coupled for data communications by at least two different networking topologies. At least one of the two networking topologies is a tiered tree topology having a root task and at least two child tasks and the at least two child tasks are peers of one another in the same tier. Embodiments include for each task, sending at least a portion of data corresponding to the task to all child tasks of the task through the tree topology; and sending at least a portion of the data corresponding to the task to all peers of the task at the same tier in the tree topology through the second topology.

6 Claims, 7 Drawing Sheets

(51) Int. Cl.
  *G06F 9/50* (2006.01)
  *G06F 15/173* (2006.01)

(56) References Cited

U.S. PATENT DOCUMENTS

| | | |
|---|---|---|
| 5,050,162 A | 9/1991 | Golestani |
| 5,083,265 A | 1/1992 | Valiant |
| 5,136,582 A | 8/1992 | Firoozmand |
| 5,193,179 A | 3/1993 | Laprade et al. |
| 5,218,676 A | 6/1993 | Ben-Ayed et al. |
| 5,319,638 A | 6/1994 | Lin |
| 5,347,450 A | 9/1994 | Nugent |
| 5,437,042 A | 7/1995 | Culley et al. |
| 5,448,698 A | 9/1995 | Wilkes |
| 5,453,978 A | 9/1995 | Sethu et al. |
| 5,617,537 A | 4/1997 | Yamada et al. |
| 5,630,059 A | 5/1997 | Brady et al. |
| 5,680,116 A | 10/1997 | Hashimoto et al. |
| 5,689,509 A | 11/1997 | Gaytan et al. |
| 5,721,921 A | 2/1998 | Kessler et al. |
| 5,758,075 A | 5/1998 | Graziano et al. |
| 5,781,775 A | 7/1998 | Ueno |
| 5,790,530 A | 8/1998 | Moh et al. |
| 5,796,735 A | 8/1998 | Miller et al. |
| 5,802,366 A | 9/1998 | Row et al. |
| 5,835,482 A | 11/1998 | Allen |
| 5,928,351 A | 7/1999 | Horie et al. |
| 5,933,425 A | 8/1999 | Iwata |
| 5,954,794 A | 9/1999 | Fishler et al. |
| 5,959,995 A | 9/1999 | Wicki et al. |
| 5,961,659 A | 10/1999 | Benner |
| 5,995,503 A | 11/1999 | Crawley et al. |
| 6,070,189 A | 5/2000 | Bender et al. |
| 6,072,781 A | 6/2000 | Feeney et al. |
| 6,081,506 A | 6/2000 | Buyukkoc et al. |
| 6,085,303 A | 7/2000 | Thorson et al. |
| 6,105,122 A | 8/2000 | Muller et al. |
| 6,161,198 A | 12/2000 | Hill et al. |
| 6,356,951 B1 | 3/2002 | Gentry, Jr. |
| 6,486,983 B1 | 11/2002 | Beshai et al. |
| 6,711,632 B1 | 3/2004 | Chow et al. |
| 6,735,662 B1 | 5/2004 | Connor |
| 6,744,765 B1 | 6/2004 | Dearth et al. |
| 6,748,413 B1 | 6/2004 | Bournas |
| 6,754,732 B1 | 6/2004 | Dixon et al. |
| 6,857,030 B2 | 2/2005 | Webber |
| 6,901,052 B2 | 5/2005 | Buskirk et al. |
| 6,977,894 B1 | 12/2005 | Achilles et al. |
| 6,981,074 B2 | 12/2005 | Oner et al. |
| 7,031,305 B1 | 4/2006 | Yu et al. |
| 7,054,958 B2 | 5/2006 | Iyer et al. |
| 7,089,289 B1 | 8/2006 | Blackmore et al. |
| 7,111,092 B1 | 9/2006 | Mitten et al. |
| 7,120,916 B1 | 10/2006 | Firth et al. |
| 7,155,541 B2 | 12/2006 | Ganapathy et al. |
| 7,319,695 B1 | 1/2008 | Agarwal et al. |
| 7,406,086 B2 | 7/2008 | Deneroff et al. |
| 7,552,312 B2 | 6/2009 | Archer et al. |
| 7,805,546 B2 | 9/2010 | Archer et al. |
| 7,827,024 B2 | 11/2010 | Archer et al. |
| 7,836,143 B2 | 11/2010 | Blocksome et al. |
| 7,890,670 B2 | 2/2011 | Archer et al. |
| 8,219,659 B2 * | 7/2012 | O'Neal et al. ............... 709/223 |
| 2003/0233497 A1 | 12/2003 | Shih |
| 2004/0001508 A1 | 1/2004 | Zheng et al. |
| 2004/0057380 A1 | 3/2004 | Biran et al. |
| 2004/0078405 A1 | 4/2004 | Bhanot et al. |
| 2004/0218631 A1 | 11/2004 | Ganfield |
| 2005/0002334 A1 | 1/2005 | Chao et al. |
| 2005/0018682 A1 | 1/2005 | Ferguson et al. |
| 2005/0033874 A1 | 2/2005 | Futral et al. |
| 2005/0068946 A1 | 3/2005 | Beshai |
| 2005/0078669 A1 | 4/2005 | Oner |
| 2005/0091334 A1 | 4/2005 | Chen et al. |
| 2005/0100035 A1 | 5/2005 | Chiou et al. |
| 2005/0108425 A1 | 5/2005 | Rabinovitch |
| 2005/0114561 A1 | 5/2005 | Lu et al. |
| 2005/0198113 A1 | 9/2005 | Mohamed et al. |
| 2005/0213570 A1 | 9/2005 | Stacy et al. |
| 2006/0002424 A1 | 1/2006 | Gadde |
| 2006/0045005 A1 | 3/2006 | Blackmore et al. |
| 2006/0045109 A1 | 3/2006 | Blackmore et al. |
| 2006/0047771 A1 | 3/2006 | Blackmore et al. |
| 2006/0056405 A1 | 3/2006 | Chang et al. |
| 2006/0075057 A1 | 4/2006 | Gildea et al. |
| 2006/0150010 A1 | 7/2006 | Stiffler et al. |
| 2006/0161733 A1 | 7/2006 | Beckett et al. |
| 2006/0161737 A1 | 7/2006 | Martin et al. |
| 2006/0190640 A1 | 8/2006 | Yoda et al. |
| 2006/0195336 A1 | 8/2006 | Greven et al. |
| 2006/0206635 A1 | 9/2006 | Alexander et al. |
| 2006/0218429 A1 | 9/2006 | Sherwin et al. |
| 2006/0230119 A1 | 10/2006 | Hausauer et al. |
| 2006/0253619 A1 | 11/2006 | Torudbakken et al. |
| 2007/0041383 A1 | 2/2007 | Banikazemi et al. |
| 2007/0165672 A1 | 7/2007 | Keels et al. |
| 2007/0198519 A1 | 8/2007 | Dice et al. |
| 2008/0016249 A1 | 1/2008 | Ellis et al. |
| 2008/0022079 A1 | 1/2008 | Archer et al. |
| 2008/0101295 A1 | 5/2008 | Tomita et al. |
| 2008/0109573 A1 | 5/2008 | Leonard et al. |
| 2008/0222317 A1 | 9/2008 | Go et al. |
| 2008/0267066 A1 | 10/2008 | Archer et al. |
| 2008/0270563 A1 | 10/2008 | Blocksome et al. |
| 2008/0273543 A1 | 11/2008 | Blocksome et al. |
| 2008/0281997 A1 | 11/2008 | Archer et al. |
| 2008/0301327 A1 | 12/2008 | Archer et al. |
| 2008/0301704 A1 | 12/2008 | Archer et al. |
| 2008/0313341 A1 | 12/2008 | Archer et al. |
| 2009/0006662 A1 | 1/2009 | Chen et al. |
| 2009/0006808 A1 | 1/2009 | Blumrich et al. |
| 2009/0019190 A1 | 1/2009 | Blocksome |
| 2009/0022156 A1 | 1/2009 | Blocksome |
| 2009/0031001 A1 | 1/2009 | Archer et al. |
| 2009/0031002 A1 | 1/2009 | Blocksome |
| 2009/0031055 A1 | 1/2009 | Archer et al. |
| 2009/0125604 A1 | 5/2009 | Chang et al. |
| 2009/0154486 A1 | 6/2009 | Archer et al. |
| 2009/0210586 A1 | 8/2009 | Tanabe |
| 2009/0248894 A1 | 10/2009 | Archer et al. |
| 2009/0248895 A1 | 10/2009 | Archer et al. |
| 2009/0276582 A1 | 11/2009 | Furtek et al. |
| 2010/0082848 A1 | 4/2010 | Blocksome et al. |
| 2010/0232448 A1 | 9/2010 | Sugumar et al. |
| 2010/0268852 A1 | 10/2010 | Archer et al. |
| 2011/0197204 A1 | 8/2011 | Archer et al. |
| 2011/0222440 A1 * | 9/2011 | Phillips et al. ............... 370/256 |
| 2011/0265098 A1 | 10/2011 | Dozsa et al. |
| 2012/0137294 A1 | 5/2012 | Archer et al. |
| 2013/0018947 A1 | 1/2013 | Archer et al. |
| 2013/0061246 A1 | 3/2013 | Archer et al. |
| 2013/0066938 A1 | 3/2013 | Archer et al. |
| 2013/0073752 A1 | 3/2013 | Blocksome |

OTHER PUBLICATIONS

Almasi, G., et al., "Architecture and Performance of the BlueGene/L Message Layer," Recent Advances in Parallel Virtual Machine and Message Passing Interface, Proceedings. 11th European PVM/MPI Users' Group Meeting Budapest, Hungary, Sep. 19-22, 2004, pp. 405-414, Springer Berlin Heidelberg. DOI: 10.1007/978-3-540-30218-6_55.

Pritchard, J., "COM and CORBA Side by Side: Architectures, Strategies, and Implementations," Jul. 1999, pp. 74-84, Addison Wesley Longman, Inc., Reading, Massachusetts, USA. ISBN 0-201-37945-7.

Zukowski, J., et al., "Mastering Java 1.2," Month: Unknown, Year: 1998, pp. 900-903, SYBEX, San Francisco, California, USA. ISBN: 0-7821-2180-2.

Fink, T., "Integrating MPI Components into Metacomputing Applications," Recent Advances in Parallel Virtual Machine and Message Passing Interface, Proceedings. 7th European PVM/MPI Users'

(56) References Cited

OTHER PUBLICATIONS

Group Meeting Balatonfüred, Hungary, Sep. 10-13, 2000, pp. 208-2015, Springer Berlin Heidelberg. DOI: 10.1007/3-540-45255-9_30.

Ribler, R., et al., "The Autopilot performance-directed adaptive control system," Sep. 1, 2001, pp. 175-187, vol. 18, No. 1, Elsevier Science Publishers, Elsevier Science Publishers B. V. Amsterdam, The Netherlands, The Netherlands. DOI: 10.1016/S0167-739X(01)00051-6.

Zhang, Y., et al., "Automatic Performance Tuning for J2EE Application Server Systems," Automatic Performance Tuning for J2EE Application Server Systems, Web Information Systems Engineering—WISE 2005, Proceedings. 6th International Conference on Web Information Systems Engineering, New York, NY, USA, Nov. 20-22, 2005, pp. 520-527, Springer Berlin Heidelberg. DOI: 10.1007/11581062_43.

Chung, I., et al., "Automated Cluster-Based Web Service Performance Tuning," Proceedings. 13th IEEE International Symposium on High Performance Distributed Computing (HPDC-13 '04), Jun. 4-6, 2004, pp. 36-44, IEEE Computer Society, CS Digital Library. ISBN: 0-7803-2175-4.

Hondroudakis, A., et al., "An Empirically Derived Framework for Classifying Parallel Program Performance Tuning Problems," Proceeding. SPDT '98 Proceedings of the SIGMETRICS symposium on Parallel and distributed Tools, Aug. 3-4, 1998, pp. 112-123, ACM, New York, NY, USA. DOI: 10.1145/281035.281047.

Gara, M., et al., "Overview of the Blue Gene/L system architecture," IBM Journal of Research & Development, Mar. 2005, pp. 195-212, vol. 49, Issue: 2.3, IEEE Xplore Digital Library. DOI: 10.1147/rd.492.0195.

Adiga, N., et al., "Blue Gene/L torUS-interconnection network," IBM Journal of Research & Development, Mar. 2005, pp. 265-276, vol. 49, Issue: 2, IBM Corp. Riverton, NJ, USA, ACM Digital Library. DOI: 10.1147/rd.492.0265.

Barnett, M., et al., "Broadcasting on Meshes with Worm-Hole Routing," Second Revised Version, Dec. 1995, pp. 1-22, CiteSeerX (Online Publication). URL: http://webcache.googleusercontent.com/search?q=cache:Kkso1JLnAYwJ:citeseerx.ist.psu.edu/viewdoc/download%3Fdoi%3D10.1.1.50.5075%26rep%3Drep1%26type%3Dps+&cd=1&hl=en&ct=clnk&gl=us.

Moreira, J., et al., "The Blue Gene/L Supercomputer: A Hardware and Software Story," International Journal of Parallel Programming, Jun. 2007, pp. 181-206, vol. 35, No. 3, Springer Science+Business Media, LLC, USA. DOI: 10.1007/s10766-007-0037-2.

Kumar, S., et al., "A Network on Chip Architecture and Design Methodology," Proceedings of the IEEE Computer Society Annual Symposium on VLSI (ISVLSI'02), Apr. 25-Apr. 26, 2002, Pittsburgh, PA, USA, pp. 105-112, IEEE Xplore Digital Library. DOI: 10.1109/ISVLSI.2002.1016885.

Brightwell, R., et al., "An Analysis of NIC Resource Usage for Offloading MPI," 2004. Proceedings. 18th International Parallel and Distributed Processing Symposium, Apr. 26-30, 2004, pp. 1-8, IEEE Xplore Digital Library. DOI: 10.1109/IPDPS.2004.1303192.

Underwood, K., et al., "The Impact of MPI Queue Usage on Message Latency," 2004 International Conference on Parallel Processing (ICPP'04), 2004, Aug. 15-18, 2004, pp. 152-160, vol. 1, IEEE Xplore Digital Library. DOI: 10.1109/ICPP.2004.1327915.

Underwood, K. et al., "A Hardware Acceleration Unit for MPI Queue Processing," 2005. Proceedings. 19th IEEE International Parallel and Distributed Processing Symposium, Apr. 4-8, 2005, 12 Pages, IEEE Xplore Digital Library. DOI: 10.1109/IPDPS.2005.30.

U.S. Appl. No. 11/776,707, filed Jul. 12, 2007, Blocksome.
U.S. Appl. No. 11/739,948, filed Apr. 25, 2007, Blocksome, et al.
U.S. Appl. No. 11/740,361, filed Apr. 26, 2007, Archer, et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 30, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Watson, Robert, "DMA Controller Programming in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
Office Action, U.S. Appl. No. 12/702,661, Dec. 14, 2012.
Office Action, U.S. Appl. No. 12/956,903, Mar. 19, 2013.
Watson, R., "DMA controller programming in C," C Users Journal, Nov. 1993, pp. 35-50 (10 Total Pages), v11 n11, R & D Publications, Inc., Lawrence, KS, USA. ISSN: 0898-9788.
Notice of Allowance, U.S. Appl. No. 12/702,661, May 15, 2013.
Notice of Allowance, U.S. Appl. No. 13/666,604, Sep. 25, 2013.
Office Action, U.S. Appl. No. 13/666,604, May 30, 2013.
Office Action, U.S. Appl. No. 13/676,700, Jun. 5, 2013.
Office Action, U.S. Appl. No. 13/671,055, Jul. 31, 2013.
Office Action, U.S. Appl. No. 13/769,715, Jul. 31, 2013.
Final Office Action, U.S. Appl. No. 13/401,975, May 23, 2014.

* cited by examiner

PERFORMING COLLECTIVE OPERATIONS IN A DISTRIBUTED PROCESSING SYSTEM

CROSS-REFERENCE TO RELATED APPLICATION

This application is a continuation application of and claims priority from U.S. patent application Ser. No. 13/181,601, filed on Jul. 13, 2011.

BACKGROUND OF THE INVENTION

1. Field of the Invention

The field of the invention is data processing, or, more specifically, methods, apparatus, and products for performing collective operations on a hybrid distributed processing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include multiple computing nodes. In a large multi-node system, each node has limited resources that can be used for inter-node communications. Propagation of information to all nodes in a large system can be a time critical problem.

SUMMARY OF THE INVENTION

Methods, apparatuses, and computer program products for performing collective operations on a hybrid distributed processing system are provided. The hybrid distributed processing system includes a plurality of compute nodes where each compute node has a plurality of tasks, each task is assigned a unique rank, and each compute node is coupled for data communications by at least one data communications network implementing at least two different networking topologies. At least one of the two networking topologies is a tiered tree topology having a root task and at least two child tasks and the at least two child tasks are peers of one another in the same tier. Embodiments include for each task, sending at least a portion of data corresponding to the task to all child tasks of the task through the tree topology; and sending at least a portion of the data corresponding to the task to all peers of the task at the same tier in the tree topology through the second topology.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
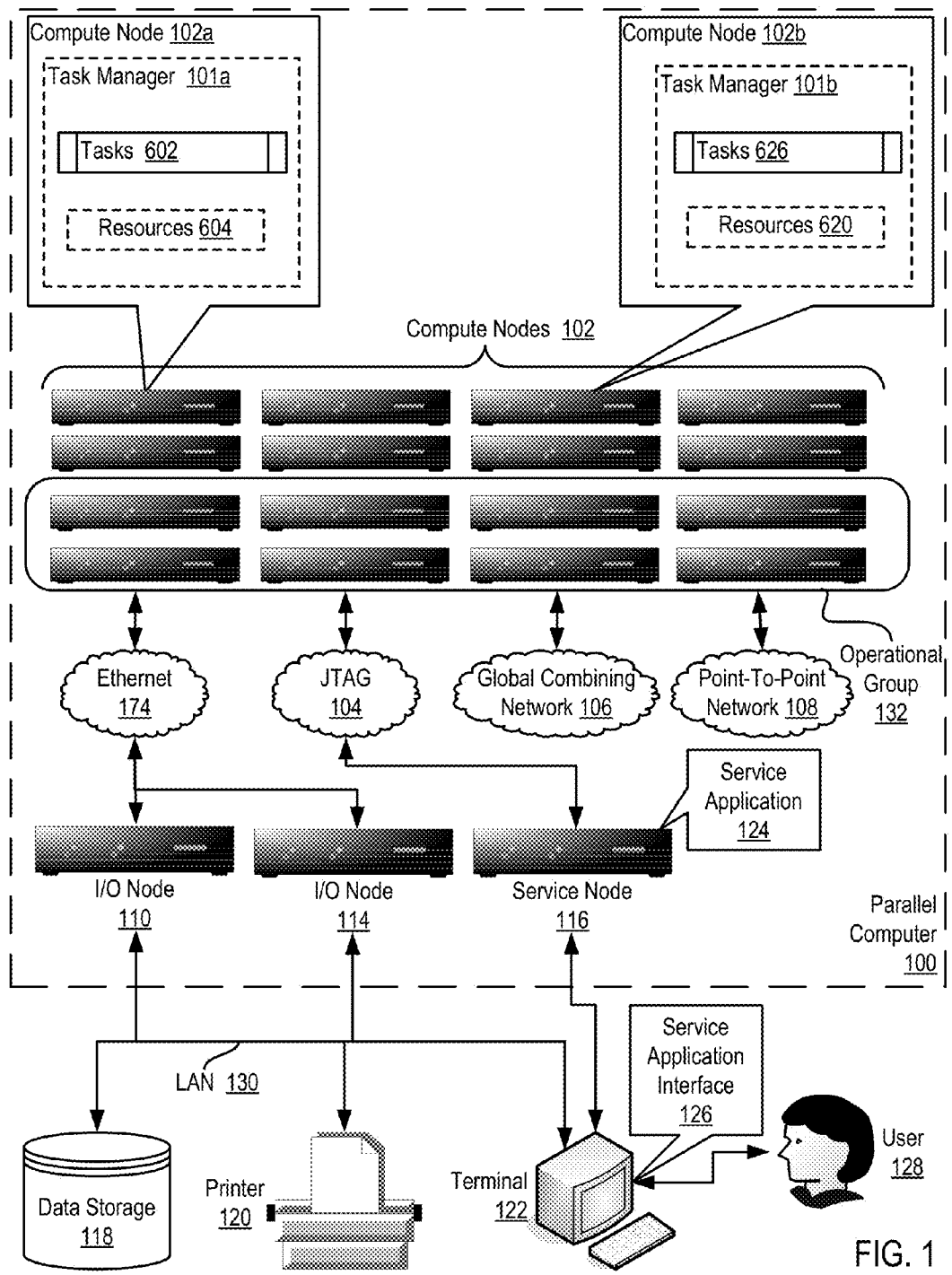
FIG. 1 sets forth example apparatus for performing collective operations on a hybrid distributed processing system according to embodiments of the present invention.

Exemplary methods, apparatus, and products for performing collective operations on a hybrid distributed processing system in accordance with the present invention are described with reference to the accompanying drawings, beginning with FIG. 1. FIG. 1 sets forth example apparatus for performing collective operations on a hybrid distributed processing system according to embodiments of the present invention. The apparatus of FIG. 1 includes a parallel computer (100), non-volatile memory for the computer in the form of a data storage device (118), an output device for the computer in the form of a printer (120), and an input/output device for the computer in the form of a computer terminal (122). The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for performing collective operations on a hybrid distributed processing system according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node.

Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for performing collective operations on a hybrid distributed processing system such as a parallel computer (100). A hybrid distributed processing system is a system that utilizes different networking topologies to perform collective operations. For example, the parallel computer (100) may utilize a tiered tree topology and a torus topology to send data corresponding to a particular task to other tasks within the parallel computer (100). Such a parallel computer (100) is typically composed of many compute nodes, but for ease of explanation two of the compute nodes in this example are referenced in particular, compute node (102*a*) and compute node (102*b*). In the example of FIG. 1, each compute node (102*a*, 102*b*) includes a plurality of tasks (602, 626). In the example of FIG. 1, each task (602, 626) represents the execution of a module of computer program instructions. Each task (602, 626) is assigned a unique rank, such that a particular task can be identified by its unique rank. In the example of FIG. 1, each compute node (102*a*, 102*b*) includes resources (604, 620) that may be made available to particular task that is executing on the compute node. Examples of such resources (604, 620) include computer memory that may be made available to a task, a computer processor that may be made available to a task, and so on.

In the example of FIG. 1, each task (602, 626) is assigned to a geometry defining the resources available to the task. In the example of FIG. 1, each task (602, 626) is assigned to a geometry by a task manager (101*a*, 101*b*), a module of computer program instructions for monitoring the operation of tasks (602, 626) and initiating task-related communications between compute nodes (102*a*, 102*b*), and so on.

In the example of FIG. 1, the task manager (101*a*, 101*b*) may for each task of a compute node, send at least a portion of data corresponding to the task to all child tasks of the task through a tree topology of a data communications network and send at least a portion of the data corresponding to the task to all peers of the task at the same tier in the tree topology through a second topology. Transmitting the data through multiple topologies enables a system to propagate information to all nodes in a large system quickly. That is, by taking advantage of multiple topology geometries and hardware support between the nodes, each node may the data faster than a system that transmits the data through a single geometry, such as a tree topology. For example, some nodes in the system may have much high speed connections, such as a torus. Therefore, a node may use the tree topology to transmit the data to children of the node then the children can use the faster high speed connections of the torus to transmit the data to the peers of the child node.

The arrangement of nodes, networks, and I/O devices making up the example apparatus illustrated in FIG. 1 are for explanation only, not for limitation of the present invention. Apparatus capable of performing collective operations on a hybrid distributed processing system according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of performing collective operations on a hybrid distributed processing system according to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Topology mapping in a distributed processing system according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of topology mapping in a distributed processing system according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
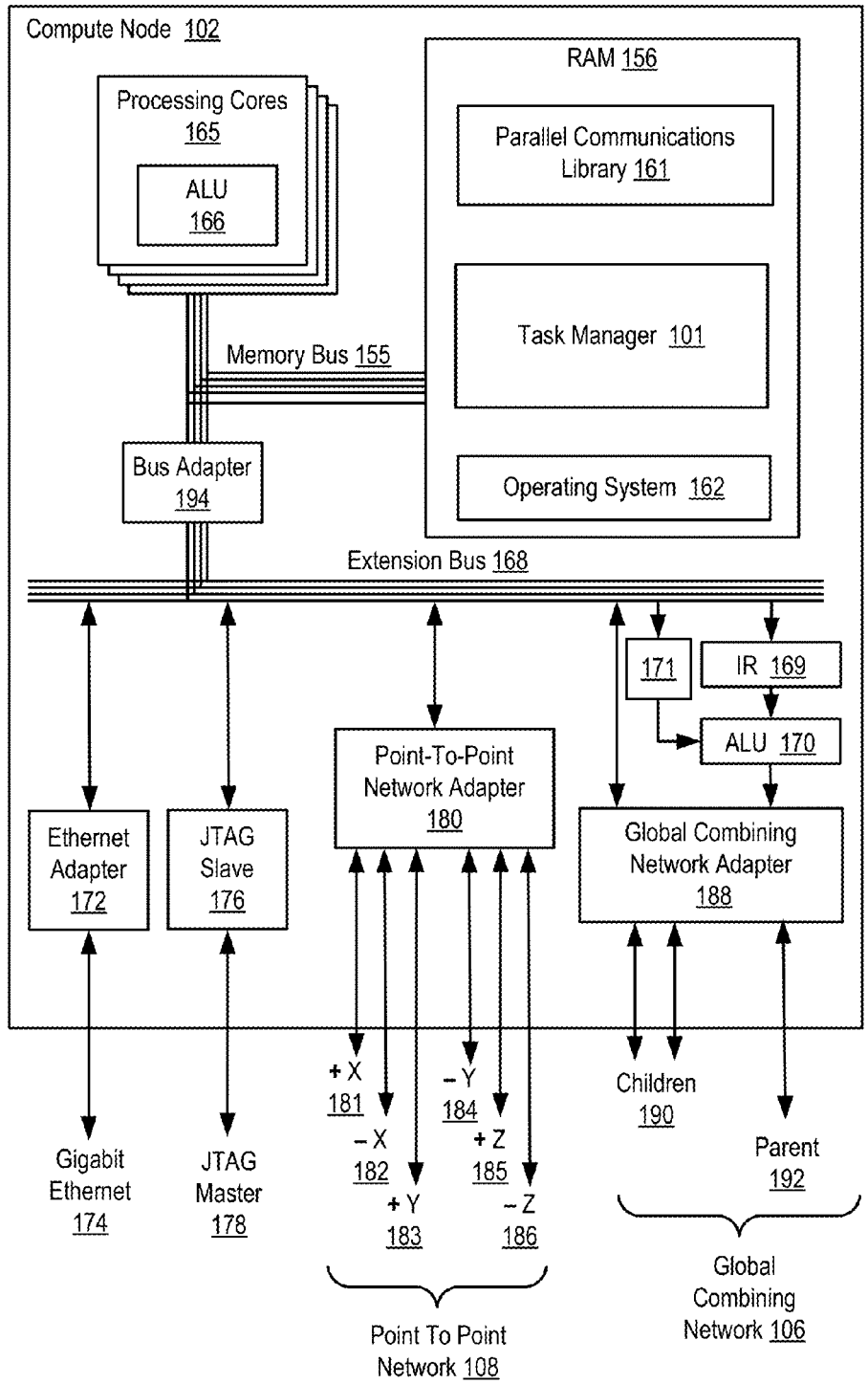
FIG. 2 sets forth a block diagram of an example compute node useful in a parallel computer capable of performing collective operations on a hybrid distributed processing system according to embodiments of the present invention.

In the example of FIG. 2, a task manager (101) is also stored in RAM (156). In the example of FIG. 2, tasks executing on the compute node (102) are managed by the task manager (101), which is a module of computer program instructions for monitoring the operation of tasks and initiating task-related communications between compute nodes, and so on.

In the example of FIG. 2, the task manager (101) may for each task of the compute node, send at least a portion of data corresponding to the task to all child tasks of the task through a tree topology of a data communications network. For example, the compute node (102) may send at least a portion of the data on the global combining network (106). In the example of FIG. 2, the task manager (101) may send at least a portion of the data corresponding to the task to all peers of the task at the same tier in the tree topology through a second topology. For example, the compute node (102) may send the data on the point to point network (108). Transmitting the data through multiple topologies enables a system to propagate information to all nodes in a large system quickly. That is, by taking advantage of multiple topology geometries and hardware support between the nodes, each node may the data faster than a system that transmits the data through a single geometry, such as a tree topology. For example, some nodes in the system may have much high speed connections, such as a torus. Therefore, a node may use the tree topology to transmit the data to children of the node then the children can use the faster high speed connections of the torus to transmit the data to the peers of the child node.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for performing collective operations on a hybrid distributed processing system include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for performing collective operations on a hybrid distributed processing system according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
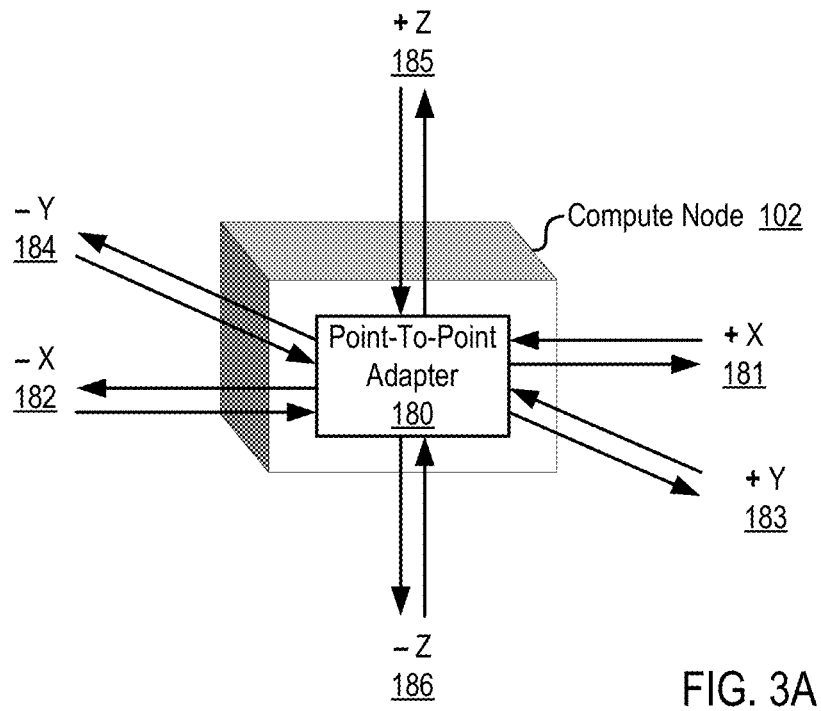
FIG. 3A sets forth a block diagram of an example Point-To-Point Adapter useful in systems for performing collective operations on a hybrid distributed processing system according to embodiments of the present invention.

For further explanation, FIG. 3A sets forth a block diagram of an example Point-To-Point Adapter (180) useful in systems for performing collective operations on a hybrid distributed processing system according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
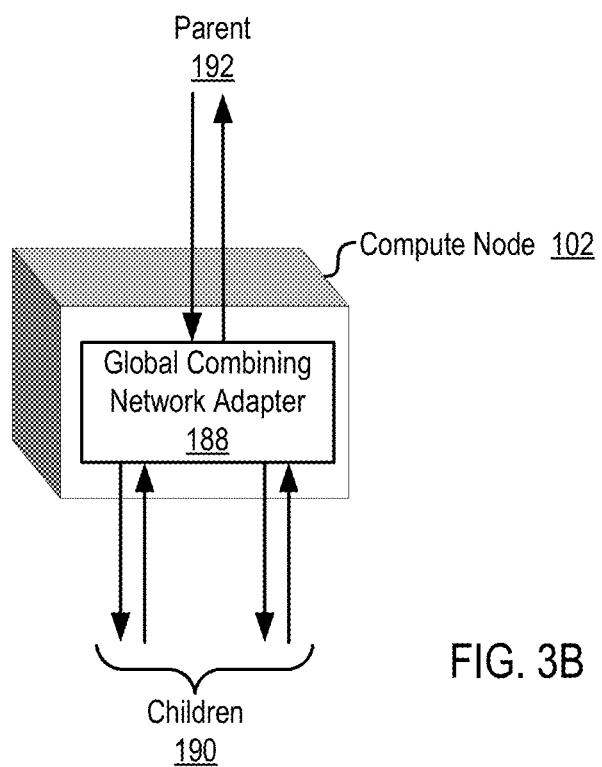
FIG. 3B sets forth a block diagram of an example Global Combining Network Adapter useful in systems for performing collective operations on a hybrid distributed processing system according to embodiments of the present invention.

For further explanation, FIG. 3B sets forth a block diagram of an example Global Combining Network Adapter (188) useful in systems for performing collective operations on a hybrid distributed processing system according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
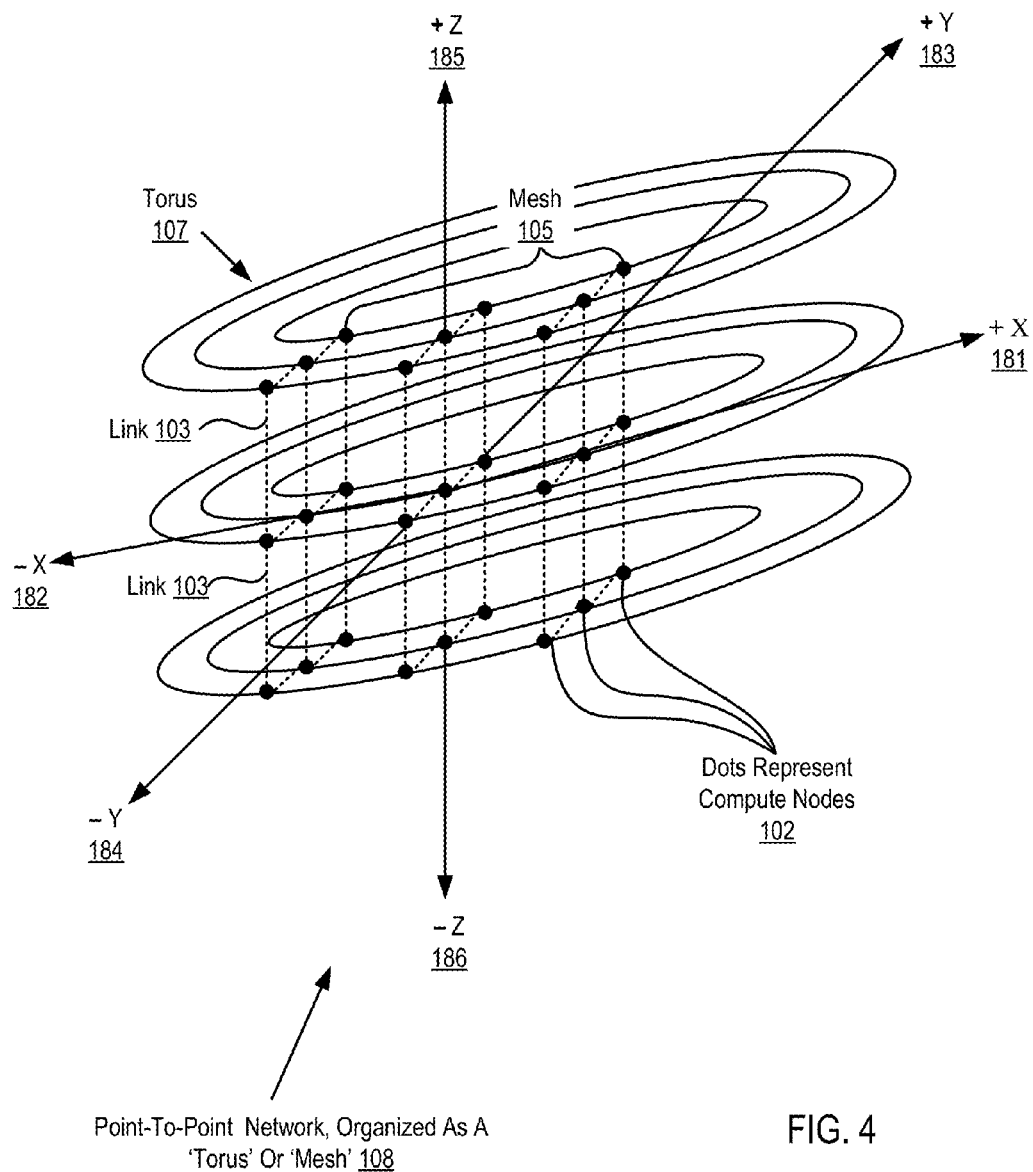
FIG. 4 sets forth a line drawing illustrating an example data communications network optimized for point-to-point operations useful in systems capable of performing collective operations on a hybrid distributed processing system according to embodiments of the present invention.

For further explanation, FIG. 4 sets forth a line drawing illustrating an example data communications network (108) optimized for point-to-point operations useful in systems capable of performing collective operations on a hybrid distributed processing system according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in performing collective operations on a hybrid distributed processing system in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in performing collective operations on a hybrid distributed processing system in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
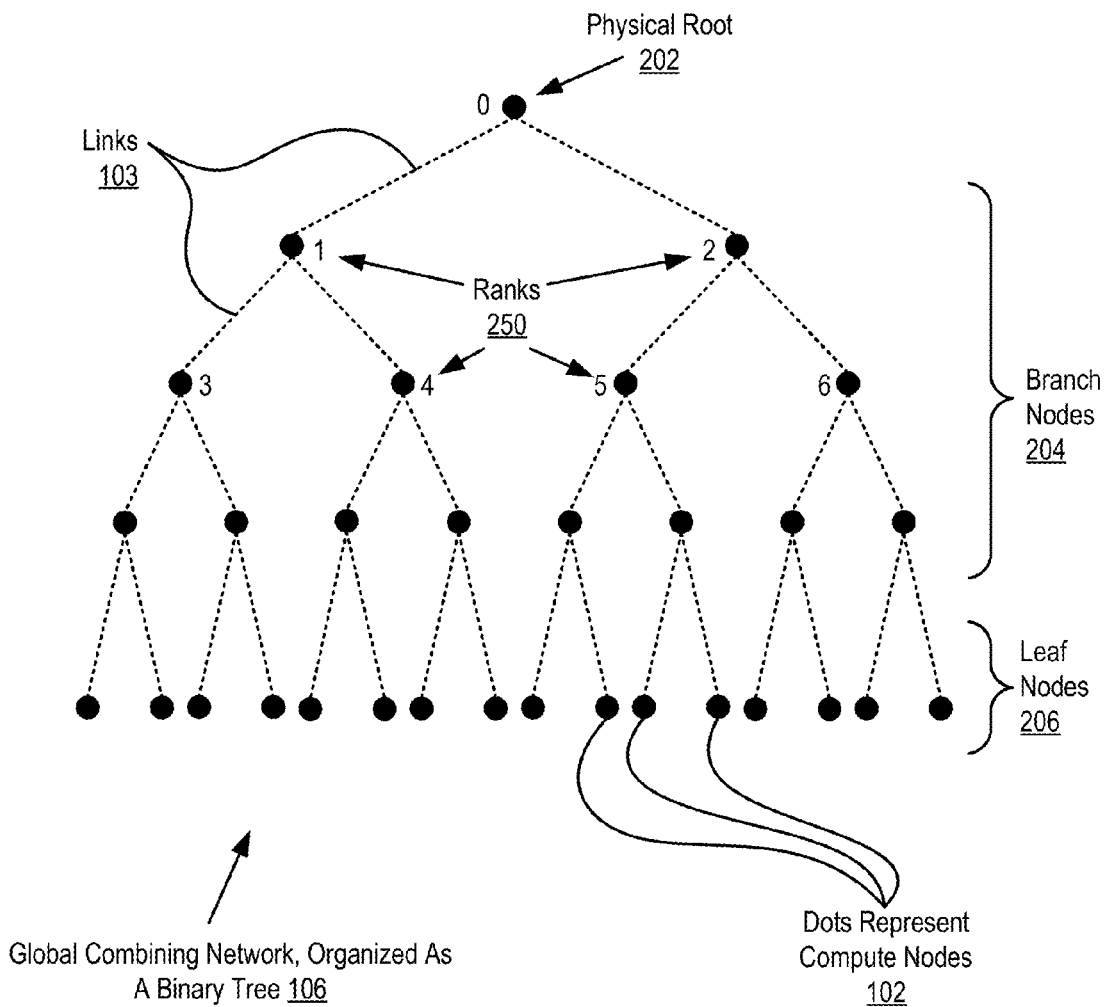
FIG. 5 sets forth a line drawing illustrating an example global combining network useful in systems capable of performing collective operations on a hybrid distributed processing system according to embodiments of the present invention.

For further explanation, FIG. 5 sets forth a line drawing illustrating an example global combining network (106) useful in systems capable of performing collective operations on a hybrid distributed processing system according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in performing collective operations on a hybrid distributed processing system in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
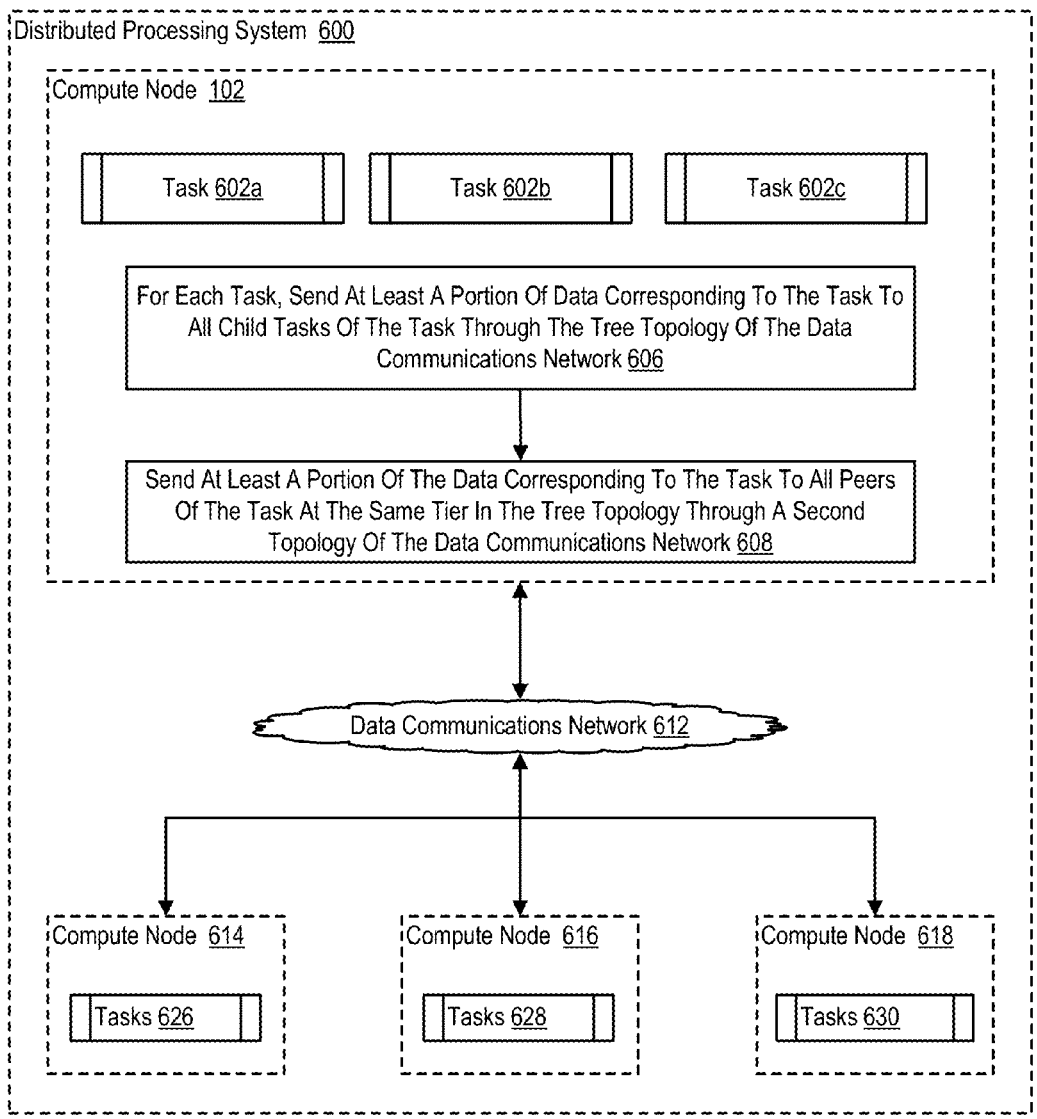
FIG. 6 sets forth a flow chart illustrating an example method for performing collective operations on a hybrid distributed processing system according to embodiments of the present invention.

For further explanation, FIG. 6 sets forth a flow chart illustrating an example method for performing collective operations on a hybrid distributed processing system (600) according to embodiments of the present invention. The hybrid distributed processing system (600) of FIG. 6 includes a plurality of compute nodes (102, 614, 616, and 620). In the example of FIG. 6, each compute node (102, 614, 616, and 620) includes a plurality of tasks (602a, 602b, 602c, 626, 628, and 630). In the example of FIG. 6, each task (602a, 602b, 602c, 626, 628, and 630) represents the execution of a module of computer program instructions. In the example of FIG. 6, each task (602a, 602b, 602c, 626, 628, and 630) is assigned a unique rank, such that a particular task can be identified by its unique rank. Each compute node (102, 614, 616, 620) is coupled for data communications by at least one data communications network (612) implementing at least two different networking topologies. In the example of FIG. 6, at least one of the two networking topologies is a tree topology having a root task, at least two child tasks, and the at least two child tasks are peers of one another.

The method of FIG. 6 includes for each task, sending (606) at least a portion of data corresponding to the task to all child tasks of the task through the tree topology of the data communications network (612). Sending (606) at least a portion of data corresponding to the task to all child tasks of the task through the tree topology of the data communications network (612) may be carried out by identifying the number of child tasks of the task, determining the number of child tasks, and dividing the data by the number of child tasks. That is, each child task may be sent one piece of the data.

The method of FIG. 6 includes sending (608) at least a portion of the data corresponding to the task to all peers of the task at the same tier in the tree topology of the data communications network (612) through the second topology of the data communications network (612). Sending (608) at least a portion of the data corresponding to the task to all peers of the task at the same tier in the tree topology of the data communications network (612) through the second topology of the data communications network (612) may be carried out by each child task broadcasting the piece of data received from the task to each of the child task's peers. That is, the child task can use the second topology to transmit the data. For example, the child task may broadcast the data to its' peers through a torus network. In this embodiment, the child task's peer connections may include high speed links. For example, some compute nodes may be connected to different data communications networks (e.g., one node is connected to a point-to-point torus network while another node is connected to a global combining network organized as a tree), some compute nodes may support different data communications protocols, some compute nodes may support different collective operations, and so on.

Figure 7:
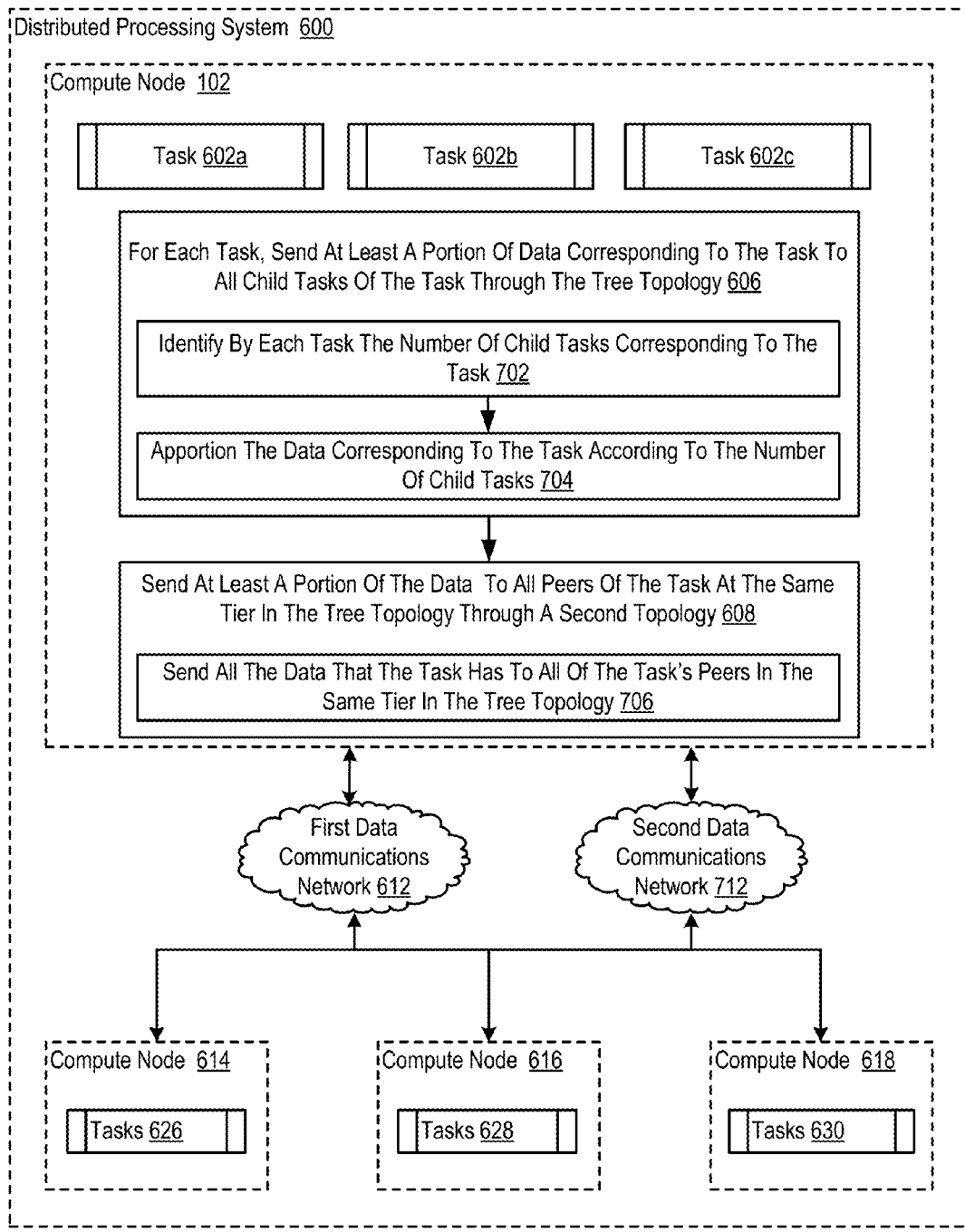
FIG. 7 sets forth a flow chart illustrating an example method for performing collective operations on a hybrid distributed processing system according to embodiments of the present invention.

For further explanation, FIG. 7 sets forth a flow chart illustrating an example method for performing collective operations on a hybrid distributed processing system (600) according to embodiments of the present invention. The example method of FIG. 7 is similar to the example method of FIG. 6 as it also includes: for each task, sending (606) at least a portion of data corresponding to the task to all child tasks of the task through the tree topology of the data communications network (612) and sending (608) at least a portion of the data corresponding to the task to all peers of the task at the same tier in the tree topology of the data communications network (612) through the second topology of the data communications network (612).

In the example of FIG. 7, two independent data communications networks connect the computer node (102) to the plurality of compute nodes (614, 616, and 618). Each data communications network (612, 712) may have a different network topology. The second network topology may include one of a torus topology and a mesh topology.

In the example of FIG. 7, sending (606) at least a portion of data corresponding to the task to all child tasks of the task through the tree topology of the data communications network (612) includes identifying (702) for each task the number of child tasks corresponding to the task. Identifying (702) for each task the number of child tasks corresponding to the task may be carried out by determining which tasks are children of the task and determining the number of determined children tasks.

In the example of FIG. 7, sending (606) at least a portion of data corresponding to the task to all child tasks of the task through the tree topology of the data communications network (612) includes apportioning (704) the data corresponding to the task according to the number of child tasks corresponding to the task.

Apportioning (704) the data corresponding to the task according to the number of child tasks corresponding to the task may be carried out by dividing the data in a buffer of the parent task by the number of identified child tasks and assigning each piece of data to a particular child task.

In the example of FIG. 7, sending (608) at least a portion of the data corresponding to the task to all peers of the task at the same tier in the tree topology of the data communications network (612) through the second topology of the data communications network (612) includes sending (706) all the data that the task has to all of the task's peers in the same tier in the tree topology. Sending (706) all the data that the task has to all of the task's peers in the same tier in the tree topology may be carried out by broadcasting the apportioned data to all peers of the child task. In this embodiment, the system is making use of both network topologies to move the data to all of the nodes in the system. Each of the child tasks can also be a parent task to other tasks. This enables each child task to send the received data to their child tasks in the same manner. If the received data becomes reduced enough, a parent task can simply send the entire subset of data it has to one of the child tasks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of performing collective operations on a hybrid distributed processing system, the hybrid distributed processing system including a plurality of compute nodes, each compute node having a plurality of tasks, each task assigned a unique rank, each compute node coupled for data communications by at least one data communications network implementing at least two different networking topologies, wherein at least one of the two networking topologies is a tiered tree topology having a root task and at least two child tasks, and wherein at least two child tasks are peers of one another in the same tier, the method comprising:

for each task and in parallel:

sending at least a portion of data corresponding to the task to all child tasks of the task through the tree topology; and sending at least a portion of the data corresponding to the task to all peers of the task at the same tier in the tree topology through the second topology.

2. The method of claim 1 wherein sending at least a portion of data to all child tasks of the task through the tree topology further comprises identifying for each task the number of child tasks and apportioning the data corresponding to the task according to the number of child tasks.

3. The method of claim 1 wherein sending at least a portion of the data to all peers of the task at the same tier in the tree topology through the second topology further comprising sending all the data that the task has to all of the task's peers in the same tier in the tree topology.

4. The method of claim 1 wherein the at least two networking topologies further comprise two independent data communications networks.

5. The method of claim 1 wherein the second networking topologies further comprises a torus topology.

6. The method of claim 1 wherein the second networking topologies further comprises a mesh topology.

* * * * *